Patented Sept. 12, 1950

2,522,050

UNITED STATES PATENT OFFICE 2,522,050

PROCESS FOR THE MANUFACTURE OF FOAM PRODUCING ALBUMINOUS PRODUCTS AND THEIR APPLICATION IN FOODSTUFFS AND LUXURIES

Jacob Lenderink, Schiedam, Netherlands

No Drawing. Application August 23, 1946, Serial No. 692,698. In the Netherlands November 25, 1942

Section 1, Public Law 690, August 8, 1946
Patent expires November 25, 1962

10 Claims. (Cl. 99—114)

For many years past investigations have been carried on to find out an albuminous product capable of rendering the same services in the preparation of foodstuffs and luxuries as the white of egg. Such albuminous products must be capable of being beaten or whipped to a stable foam of sufficient firmness to enable its use as such. Foaming albuminous products are also used for preparing batter from which porous or spongy finished products are baked, and in the manufacture of ice creams.

Various processes have already been proposed to produce foaming albuminous products from natural proteins, particularly from milk proteins. Thus, for instance, it is known to add acid to milk protein in such amount as to adjust the pH of a solution of the desired concentration at above 5 (Netherlands Patent application No. 99,642). Also the addition of other substances, for instance salts of hydroxy-acids, has already been proposed to improve the foam producing capacity of proteins.

The present invention relates to a process for the preparation of foam producing albuminous products, according to which vegetable and/or animal proteins are hydrolysed to such a degree, that the resulting product possesses a strong foaming capacity in aqueous solution. The said hydrolysis may be effected with the aid of acids, bases, or enzymes, or by a combination of such treatments. The acids or bases are intended to include also the acid- or basic-reacting salts or other compounds.

It has been found that from the beginning of the hydrolysis on the natural protein the material will become more suitable for the purpose in view. Accordingly as the hydrolysis of the protein progresses, the capacity of producing a large volume of foam of a good firmness will be enhanced. For some purposes, for instance for the manufacture of foam that must be baked, the simultaneous presence of non-hydrolysed protein is desirable. For instance, use may be made of a product containing 5–40% of polypeptides; excellent results are obtained with products having a polypeptide content of 20–25%.

It has been found possible in this manner to obtain products which are extremely suitable for use as foam producing albuminous products for the above mentioned purposes. They yield very voluminous and firm foamy masses which also after the addition of sugar retain a sufficient firmness, and which are even suitable in cases where the foam obtained from white of egg is unsatisfactory. The foam masses obtained from these products by beating with the addition of sugar or syrups are highly suitable for decorating or confectionery work. They allow of being baked, the indented edge formed by piping remaining perfectly sharp, and the volume being also maintained. They are also suitable for the manufacture of nougat and sponge cake.

Although it is possible to carry out the hydrolysis with dilute acids and with enzymes, the hydrolysis with the aid of bases is preferred for practical purposes. As bases, alkali hydroxides or carbonates, such as caustic soda or soda carbonate, may be used. Preferably, however, alkaline-earth hydroxides are used, particularly calcium hydroxide, which is not only very cheap, but produces albuminous products with excellent frothing capacity. During the treatment with alkaline earth hydroxide part thereof is absorbed by the protein molecule and consequently the albuminous products thus prepared contain a certain amount of alkaline earth. This appears to favourably affect the properties of the albuminous product.

The hydrolysis may be carried out at room temperature or at an increased temperature, if desired also under pressure. In order to obtain the desired degree of hydrolysation the treatment with calcium hydroxide should be continued for a long time, for instance, for a couple of days or longer.

A suitable method for hydrolysing the protein to the desired degree consists in adding to the protein solution or suspension such quantities of calcium hydroxide as to yield a pH-value of 11–12. The liquid is left standing for some time, during which period a hydrolysis of the protein takes place and the pH decreases. When the pH has fallen to approximately 9½–10½, the hydrolysis has proceeded so far that an albuminous product with a good foaming capacity is obtained. If the hydrolysis is carried further, if necessary after raising the pH again by the addition of a further amount of lime, the foaming capacity will be enhanced further. If the protein is broken down too far, the foaming capacity will begin to decrease and may eventually disappear almost entirely. It may sometimes be advantageous to carry out the hydrolysis successively, for instance, by starting at a pH of 11, allowing it to fall to 10, and thereupon raising it again to 11 by the addition of a fresh amount of lime.

It is also possible to carry out the hydrolysis at a lower pH than that indicated above. In that case the process will proceed slower and the pH may come within a range allowing the growth of bacteria so that there is the danger of the solution being spoiled.

The enzymatic hydrolysis may e. g. be effected with the aid of rennet.

As starting materials for the process according to the invention, use may particularly be made of milk proteins, for instance casein, but also very suitable products may be obtained from other proteins, such as blood albumin, yeast and vegetable proteins. One may start from pure proteins, as well as from materials containing considerable amounts of protein, such as skim milk powder. If necessary, fatty constituents may first be removed from the raw material. The hydrolysis may advantageously be carried out in solutions containing 100 g. of protein or more per liter.

If desired, combinations of the treatment described above may also be applied. Thus, for instance, the proteic material may first be subjected to a breakdown by enzymatic action and thereupon hydrolysed with the aid of lime.

As already mentioned above, the presence of an alkaline earth metal, such as calcium, in the hydrolyzed albuminous product has a favorable influence on the foam producing properties of the polypeptides. A similar improvement may also be attained by treating the proteic material with alkaline earth compounds, after it has been hydrolyzed to the desired degree, e. g. with the aid of acids, bases or enzymes. This after-treatment does not result in a substantial further hydrolysis, only alkaline earth ions are bound by the polypeptide molecule. In some cases, e. g. if the hydrolysis has been carried out with acid, it will be advantageous to add alkaline earth oxides, hydroxides or carbonates for that purpose; in other cases the polypeptide-containing material may be treated with soluble alkaline earth salts. Among the alkaline earth compounds those of calcium and magnesium are generally preferred.

Instead of or together with alkaline earth compounds also organic bases, such as triethanolamine, may be added. It has been found, that the addition of organic bases may produce an important improvement of the foaming capacity.

The solutions prepared in accordance with the invention may be used as such, if desired after neutralisation of the excess of base or acid, or they can be evaporated to dryness, e. g. by spray drying.

If desired, the dry albuminous products may directly be admixed with other substances which are desired in the subsequent use of the product in foodstuffs or luxuries, such as flour, starch, sugar, gums, baking powders and the like.

It was already known to prepare substitutes for white of egg from milk proteins by adding to solutions thereof so much of a base, particularly calcium hydroxide, as to raise the pH of the solution to above 8 (Netherlands Patent specification No. 54,240) or even to above 10 (Netherlands Patent application No. 102,305), and thereupon evaporating the solution. However, any appreciable hydrolysis does not take place by this treatment and therefore the knowledge that a partial hydrolysis of the proteins has a highly favourable influence on the foam producing capacity could not be derived from the said patent specifications.

The products manufactured in accordance with the invention can be used in bakeries and confectioners' shops in all cases where foamy masses are desired, for instance for decorating purposes, for preparing light cake, imitation whipped cream, ice cream and the like. The invention also comprises the use of the albuminous products for these purposes. However, the albuminous products may also be used for preparing foamy masses for other purposes, e. g. for fire-extinguishers. The solutions obtained by hydrolysis may be used as such or after dilution with water. If desired, the stability and the firmness of the foam may be improved by the incorporation of substances which increase the viscosity of the protein solution, for instance starch derivatives. Also surface-active substances, e. g. wetting agents, may give an improvement.

Example I 100 kg. of casein is moistened with 100 l. of water, in which 100 g. of rennet and 50 g. of erepsine are dissolved. After the mass has been left standing at room temperature so as to produce a breakdown of the casein, it is suspended in 700–800 l. of water and the pH of the suspension is adjusted to 8–9 by the addition of calcium hydroxide. The liquor is then kept at 35–40° C. until the desired foaming capacity has been attained, what may be controlled by means of baking tests. Thereupon the solution is dried, e. g. by spray evaporation.

Example II 50 kg. of casein is mixed up in 400 l. of water and thereupon 10 kg. of calcium hydroxide is stirred in, whereby the pH is raised to about 12. The liquor is then allowed to stand for about 5 days at 40° C., and finally dried by spray evaporation.

Example III

To a mixture of 100 kg. of soya protein and 1000 l. of water 1 kg. of pepsine and so much hydrochloric acid are added as to yield a pH of 2–3. The mass is kept at a temperature of 35° C. After some days the breakdown has proceeded to the point that calcium hydroxide may be added, up to a pH of about 8. After a few hours of stirring the liquor is dried as by spray evaporation.

I claim:

1. A process of manufacturing foaming agents comprising subjecting a protein of the group consisting of milk, egg, blood and yeast proteins and vegetable proteins to a hydrolysis in an aqueous solution by a substance selected from the group consisting of calcium hydroxide and magnesium hydroxide at a pH of at least 10 and a temperature substantially below 100° C. for a period of at least two days, the hydrolysis being continued until a mixture of protein and polypeptides containing 5–40% of polypeptides and having strong foaming properties is produced.

2. A process of manufacturing foaming agents comprising subjecting a protein of the group consisting of milk, egg, blood and yeast proteins and vegetable proteins to a hydrolysis in an aqueous solution by a substance selected from the group consisting of calcium hydroxide and magnesium hydroxide at a pH of at least 10 and at a temperature substantially below 100° C. for a period of at least two days, the hydrolysis being continued until a mixture of protein and polypeptides containing 5–40% of polypeptides and having strong foaming properties is produced.

3. A process of manufacturing foaming agents comprising subjecting a protein of the group consisting of milk, egg, blood and yeast proteins and vegetable proteins to a hydrolysis in an aqueous solution by a substance selected from the group consisting of calcium hydroxide and magnesium hydroxide at a pH of 11-12 and a temperature substantially below 100° C. for a period of at least two days, the hydrolysis being continued until a mixture of protein and polypeptides containing 5-40% of polypeptides and having strong foaming properties is produced.

4. A process of manufacturing foaming agents comprising subjecting a protein of the group consisting of milk, egg, blood and yeast proteins and vegetable proteins to a hydrolysis in an aqueous solution by a substance selected from the group consisting of calcium hydroxide and magnesium hydroxide at a pH of about 12 and a temperature substantially below 100° C. for a period of at least two days, the hydrolysis being continued until the pH has decreased to about 10.

5. A process of manufacturing foaming agents comprising subjecting a protein of the group consisting of milk, egg, blood and yeast proteins and vegetable proteins to a hydrolysis in an aqueous solution by a substance selected from the group consisting of calcium hydroxide and magnesium hydroxide at a pH of about 12 and a temperature substantially below 100° C. for a period of at least two days, the hydrolysis being continued until the pH has decreased to about 10, and increasing the pH again to about 11-12 by adding a further quantity of the alkaline reagent.

6. A process of manufacturing foaming agents comprising subjecting a protein of the group consisting of milk, egg, blood and yeast proteins and vegetable proteins to a hydrolysis in an aqueous solution by alkali at a pH of at least 10 and a temperature substantially below 100° C. for a period of at least two days and adding a calcium salt to the reaction mixture, the hydrolysis being continued until a mixture of protein and polypeptides containing 5-40% of polypeptides and having strong foaming properties is produced.

7. A process of manufacturing foaming agents in dry condition comprising subjecting a protein of the group consisting of milk, egg, blood and yeast proteins and vegetable proteins to a hydrolysis in an aqueous solution by a substance selected from the group consisting of calcium hydroxide and magnesium hydroxide at a pH of at least 10 and a temperature substantially below 100° C. for a period of at least two days, the hydrolysis being continued until a mixture of protein and polypeptides containing 5-40% of polypeptides and having strong foaming properties is produced and subsequently evaporating the solution.

8. Foodstuffs having a substantial amount of air incorporated therein containing as a foaming agent a protein of the group consisting of milk, egg, blood and yeast proteins and vegetable proteins which has been subjected to a hydrolysis in an aqueous solution by a substance selected from the group consisting of calcium hydroxide and magnesium hydroxide at a pH of at least 10 and a temperature substantially below 100° C. for a period of at least two days, and consists of a mixture of protein and polypeptides containing 5-40% of polypeptides.

9. A process of manufacturing foaming agents comprising subjecting a protein of the group consisting of milk, egg, blood and yeast proteins and vegetable proteins, which has previously been partially hydrolysed by an acid reagent, to a hydrolysis in an aqueous solution by a substance selected from the group consisting of calcium hydroxide and magnesium hydroxide of a pH of at least 10 and a temperature substantially below 100° C. for a period of at least two days, the hydrolysis being continued until a mixture of protein and polypeptides containing 5-40% of polypeptides and having strong foaming properties is produced.

10. A process of manufacturing foaming agents comprising subjecting a protein of the group consisting of milk, egg, blood and yeast proteins and vegetable proteins, which has previously been partially hydrolysed by an enzyme, to a hydrolysis in an aqueous solution by a substance selected from the group consisting of calcium hydroxide and magnesium hydroxide at a pH of at least 10 and a temperature substantially below 100° C. for a period of at least two days, the hydrolysis being continued until a mixture of protein and polypeptides containing 4-40% of polypeptides and having strong foaming properties is produced.

JACOB LENDERINK.

REFERENCES CITED

The following references are of record in the file of this patent:

UNITED STATES PATENTS

| Number | Name | Date |
|---|---|---|
| 1,996,800 | Fischer | Apr. 9, 1935 |
| 2,241,927 | Sahyun | May 13, 1941 |
| 2,349,969 | Kremers | May 30, 1944 |
| 2,414,299 | Hall | Jan. 14, 1947 |

FOREIGN PATENTS

| Number | Country | Date |
|---|---|---|
| 16,708 | Great Britain | July 6, 1901 |

OTHER REFERENCES

"Colorimetric Determination of Hydrogen Ion Concentration and for Water Analysis," page 20, 1929 edition. La Motte Chemical Products Co., Baltimore, Md., publishers.